United States Patent Office

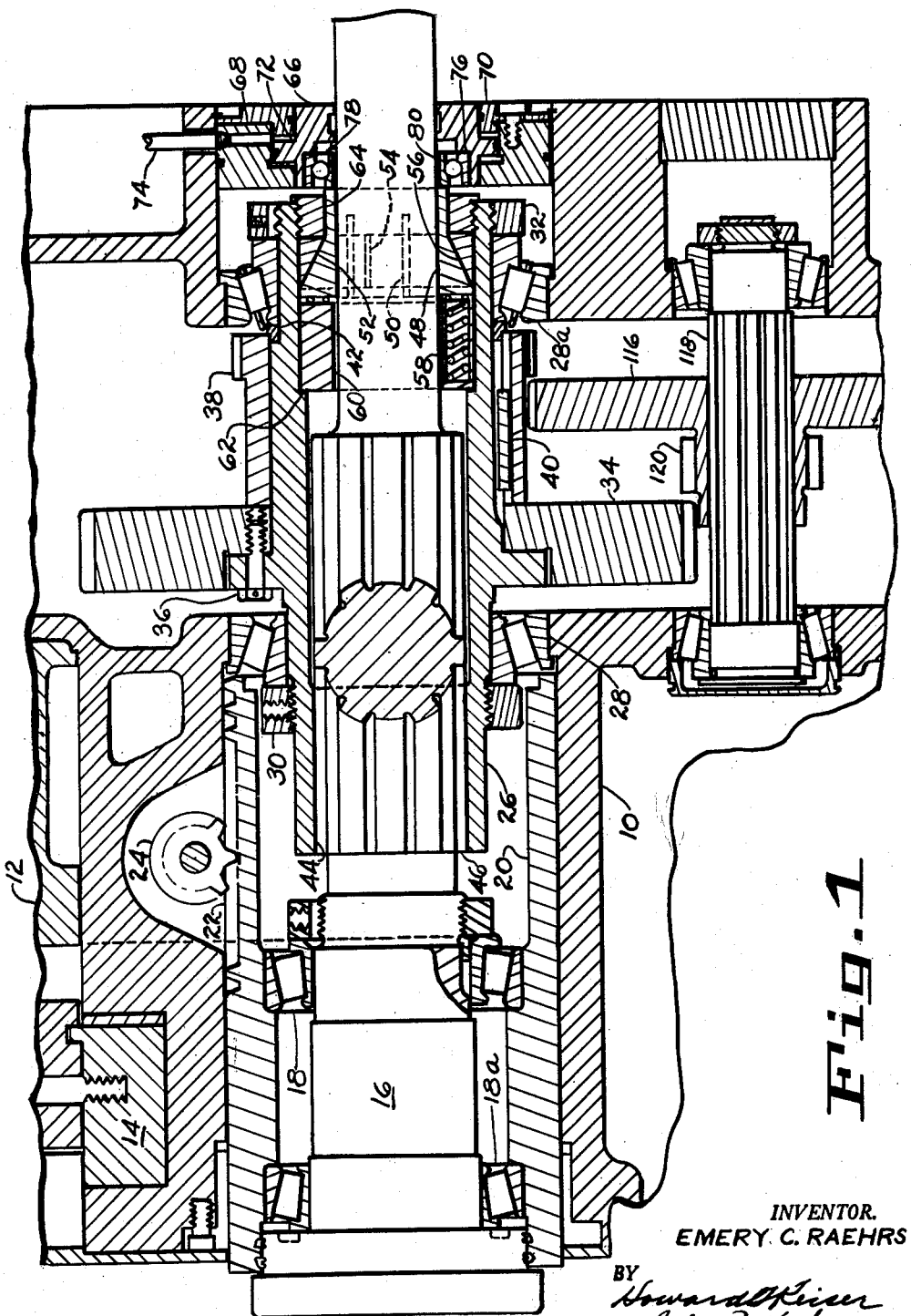

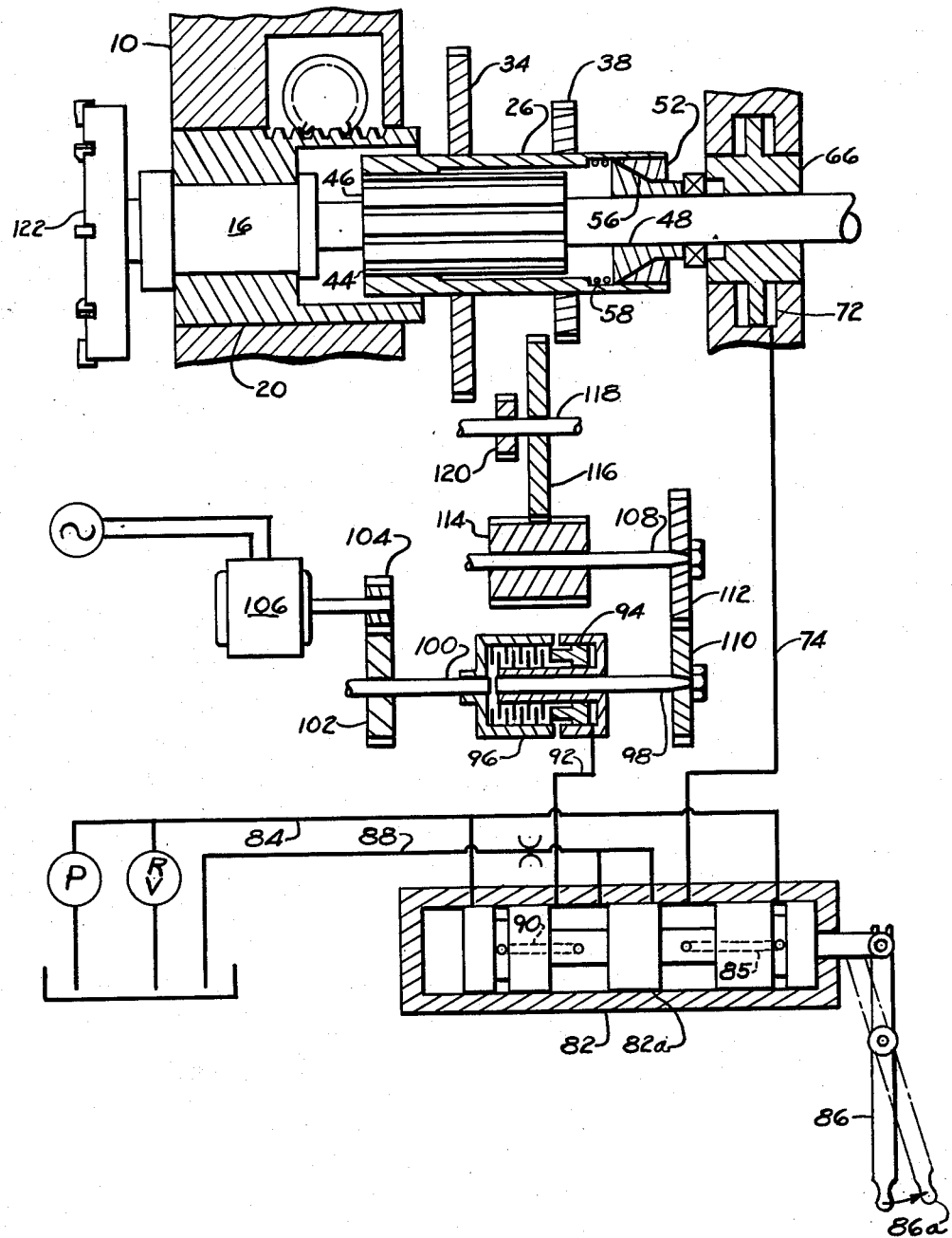

3,124,998
Patented Mar. 17, 1964

3,124,998
TRANSMISSION MECHANISM
Emery C. Raehrs, Cincinnati, Ohio, assignor to The Cincinnati Milling Machine Co., Cincinnati, Ohio, a corporation of Ohio
Filed Apr. 14, 1961, Ser. No. 103,006
5 Claims. (Cl. 90—11)

This invention relates to a transmission mechanism and is particularly adapted for use in a machine tool spindle drive.

In milling type metal cutting operations, objectionable chatter is sometimes produced as a result of the inherent backlash between the spindle on which the cutting tool is fixed and the gear by which drive is transmitted to the spindle. The backlash combines with the rapidly varying load reflected to the spindle drive mechanism from the cutter to cause an oscillatory movement between the spindle and driving gear which results in excessive wear of machine parts, noise, and unsatisfactory finish on machined parts. It has been found that the chatter is reduced when the drive to the spindle is applied at a radius greater than the radius of the cutting tool.

Many milling machines, particularly bed type millers, utilize a spindle which is axially adjustable or automatically retractable. A common way of providing for the axial spindle movement relative to the driving train of gears is to provide a splined drive member which mates with and drives through a mating splined diameter portion of the spindle. This splined diameter portion is often smaller than the radius of face milling cutters or other large cutters to be used with the machine. Consequently, the chatter produced by the oscillation between the splined members is usually troublesome when these large diameter cutters are used.

It is therefore an object of this invention to provide a transmission mechanism which reduces the chatter produced between splined drive members of the mechanism when a rapidly varying load is reflected thereto.

It is a further object to provide a transmission mechanism for a milling machine spindle in which the spindle is axially adjustable through a splined driving member but in which objectionable chatter is greatly reduced.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

A machine tool spindle mechanism constructed in accordance with the preferred form of the invention utilizes a releasable clutch mechanism between a spindle and a splined driving member engaged with and rotating the spindle. The clutch mechanism is comprised of mating tapered collets which are forced together in a wedging manner to produce clamping forces tending to relatively fix the spindle and the splined driving member. The clamping forces are capable of resisting and dissipating the forces which are reflected to the mechanism from the cutting tool and which tend to create the chatter producing oscillations between the spindle and splined driving member. Thus, the machine tool performs better and is useful longer.

A clear understanding of the present invention can be obtained from the following detailed description with reference to the attached drawings wherein:

FIG. 1 is a sectional view of a milling machine spindle carrier.

FIG. 2 is a schematic hydraulic operating circuit.

A horizontal section of a milling machine spindle carrier is shown in FIG. 1. The carrier housing 10 is supported on a column 12 for vertical movement along a guide way 14. A spindle 16 is journaled in annular tapered bearings 18, 18a received in an axially movable quill 20. The quill 20 has a rack form 22 thereon which is engaged by a pinion 24 journaled in the carrier housing 10. As the pinion 24 is rotated, the quill 20 is moved axially. The annular bearings 18, 18a are received between the spindle 16 and quill 20 in a manner preventing relative axial movement therebetween. Consequently, as the quill 20 is moved by the pinion 24, the spindle 16 is also moved thereby.

A drive sleeve 26 is received around the spindle 16. The drive sleeve 26 is journaled for rotation in annular tapered bearings 28, 28a which are axially retained on the sleeve 26 by nuts 30, 32 respectively in such a manner as to prevent axial movement of the sleeve 26 in the carrier housing 10. A large diameter gear 34 is fixed to the sleeve 26 by bolts 36. A small diameter driving gear 38 is fixed to the sleeve adjacent the large gear 34 by a key 40 and a collar 42. The sleeve 26 has a splined bore portion 44 at one end. The splined portion 44 is mated with a splined diameter portion 46 of the spindle 16. Therefore, when the sleeve 26 is rotated, the spindle 16 is rotated through the driving engagement of the splined portions 44, 46, respectively, of the sleeve 26 and spindle 16.

A clutch mechanism is received between the sleeve 26 and spindle 16 which is operable to tend to relatively fix the spindle 16 and sleeve 26. The clutch mechanism is comprised of a collet 48 which has splits 50 therein to make it contractable. When the collet 48 is not contracted it is loosely received on the spindle 16 and movable relative thereto. Received in the end of the sleeve 26 around the split collet 48 is a collet 52 which has a split 54 extending across it making the collet 52 expandable. The collets 48, 52 have mating tapered surfaces 56 which provide a wedging effect to contract one collet 48 and expand the other collet 52 when the two collets 48, 52 are forced axially together. The axial force is provided by a set of strong springs 58 which are received in an annular member 60 which is received in the sleeve 26 against a shoulder 62. The springs 58 force the contractable collet 48 toward the expandable collet 52 which is axially retained in the sleeve by a threaded retainer 64 engaged in the end of the sleeve 26. Thus the force of the springs 58 wedges the collets 48, 52 together contracting one 48 and expanding the other 52. The spindle is then gripped by the contracted collet 48 and the sleeve is gripped by the expanded collet 52. The friction between the tapered surfaces 56, between the sleeve 26 and the expandable collet 52, and between the collet 48 and spindle 16 create strong opposition to relative movement between those members and the spindle 16 and sleeve 26 are effectively clamped together by members producing forces tending to resist relative movement therebetween.

The collets 48, 52 may be released from the spindle 16 and sleeve 26, respectively, by operation of an annular plunger 66 loosely received around the spindle 16 at the rear of the sleeve 26. The plunger 66 is encompassed by members 68, 70 received in the carrier housing 10 and which define a cylinder chamber 72 to which fluid under pressure may be introduced through a fluid line 74. When the fluid line 74 connects fluid under pressure to the cylinder chamber 72 at the rear of the plunger 66 (the right side thereof as viewed in FIG. 1), the plunger 66 is forced toward the front of the machine (to the left as viewed in FIG. 1). The plunger 66 engages the outer race 76 of an angular contact annular thrust bearing 78, the inner race 80 of which is engaged with the contractable split collet 48. Thus, with sufficient pressure in the cylinder chamber 72, the collet 48 on the spindle 16 will be forced away from the collet 52 in the sleeve 26 against the springs 58 to separate the tapered surfaces 56 and release the spindle 16 from the sleeve 26.

The schematic diagram of FIG. 2 shows a simplified operative circuit for a machine spindle. A valve 82, in the position shown, connects fluid under pressure from a line 84, through a passage 85 in the valve plunger 82a to the line 74 which connects with the cylinder chamber 72 to move the plunger 66 toward the collet 48 to separate the surfaces 56. Therefore the spindle 16 is released from the sleeve 26 for axial adjustment. When the lever 86 is moved to the position 86a, the plunger 82a of the valve 82 moves to the left and line 74 is connected to the return line 88 and the springs 58 in the sleeve 26 force the contractable collet 48 against the expandable collet 52 and relative movement between the sleeve 26 and spindle 16 is resisted.

With the plunger 82a of the valve 82 shifted to the left, pressure from the line 84 is connected through a passage 90 in the plunger 82a to a fluid line 92 connected to plungers 94 of a hydraulic clutch 96. When pressure is in the clutch 96, shafts 98, 100 are connected to rotate together. Shaft 100 is connected through gears 102, 104 to an electric spindle drive motor 106. When shafts 98 and 100 are connected, the shaft 108 is rotated by pick-off gears 110, 112 fixed on the ends of shafts 98 and 108 respectively. A wide gear 114 is fixed on the shaft 108 and is engaged by a gear 116 fixed for rotation with a splined shaft 118 on which the gear 116 is movable (by means not shown) to the left and to the right. When the gear 116 is moved to the right (as viewed in FIG. 2), it engages the small diameter gear 38 fixed on the sleeve 26. Thus the sleeve 26 is rotated to drive the spindle 16. Another gear 120 is slidably received on the splined shaft 118. If gear 120 is moved to the left, the large diameter gear 34 on the sleeve 26 is engaged by the gear 120 fixed for rotation with the shaft 118 to rotate the sleeve 26 and spindle 16 (the splined shaft 118 and the gears 116 and 120 are shown in detail in FIG. 1).

When a large diameter cutter 122 is used, the drive to the spindle 16 is through the large diameter gear or slow speed range gear 34. Since the clutch mechanism including the collets 48, 52 is clamping the sleeve to which the gear 34 is rigidly fixed to the spindle 16, the oscillations which tend to be produced between the sleeve 26 and spindle 16 in the backlash in the splined portions 44, 46 are resisted by the clamping forces of the clutch mechanism and are thereby suppressed. If the drive is through the small diameter gear or the high speed range gear 38 the tendency for oscillation between the sleeve 26 and spindle 16 is likewise suppressed. However, in the high speed range, the cutter diameter is usually greatly reduced from that of the slow speed range since the peripheral speed of the cutter 122 must be approximately the same between large and small diameter cutters of the same type.

When the machine spindle 16 is stopped, the lever 86 and valve plunger 82a are back in the position shown and the clutch fluid line 92 is connected to the return line 88 through the valve 82. The clutch 96 is deenergized and shaft 100 is disconnected from shaft 98. The fluid line 74 is again connected to pressure and the spindle released from the sleeve 26 for axial movement or adjustment therein.

What is claimed is:

1. A machine tool spindle transmission comprising in combination, a rotatable drive member having a splined bore therein, a spindle received through said drive member having a splined diameter mating with said bore, the spindle subjected to a rapidly varying load torque tending to produce chatter between said drive member and spindle, means to rotate said drive member and effect rotation of said spindle, a contractable annular collet received on said spindle having a tapered external surface, an expandable annular collet received in said drive member having a tapered internal surface, means to urge said collets together at said tapered surfaces and produce forces tending respectively to contract and expand said collets for relatively fixing said drive member and spindle together, said forces tending to suppress said chatter, means to separate said collets and free said spindle for axial adjustment, and means to axially adjust said spindle in said drive member.

2. A machine tool spindle drive mechanism comprising in combination, a rotatable sleeve having a splined bore therein, a spindle received through said sleeve having a splined diameter mating with said bore, the spindle subjected to a rapidly varying load torque tending to produce chatter between said sleeve and spindle, means to rotate said sleeve and effect rotation of said spindle, a contractable annular collet received on said spindle having a tapered external surface, an expandable annular collet received in said sleeve around said spindle having a tapered internal surface adjacent to said tapered external surface, bias means in said sleeve to urge said contractable collet toward said expandable collet and produce forces between said tapered surfaces tending respectively to contract and expand said collets for relatively fixing said sleeve and spindle together, said forces tending to suppress said chatter, means operable to urge said contractable collet away from said expandable collet to overcome said bias means and separate said collets, said spindle thereby released from said sleeve for axial adjustment, and means to axially adjust said spindle in said sleeve.

3. A machine tool spindle drive mechanism comprising in combination, a rotatable drive sleeve having a splined bore at one end thereof, a spindle received through said sleeve having an elongated splined diameter mating with said bore, said spindle subjected to a rapidly varying load torque tending to produce chatter between said sleeve and spindle, means to rotate said sleeve and effect rotation of said spindle, a contractable split collet received on said spindle and axially positionable relative thereto, said collet having a tapered external surface, an expandable split collet received in said sleeve at the other end thereof, said expandable collet having a tapered internal surface adapted to engage said tapered external surface, a set of springs received in said sleeve and engaged with said contractable collet to urge said contractable collet toward said expandable collet and produce forces between said tapered surfaces tending respectively to contract and expand said collets for relatively fixing said sleeve and spindle together, said forces tending to suppress said chatter, means operable to urge said contractable collect away from said expandable collet against said set of springs and separate said tapered surfaces, said spindle thereby released from said sleeve for axial adjustment, and means to axially adjust said spindle in said sleeve.

4. A machine tool spindle drive mechanism comprising in combination, a rotatable drive sleeve having a splined bore at one end thereof, a spindle received through said sleeve having an elongated splined diameter mating with said bore, the spindle adapted to receive a cutting tool operable to transmit a rapidly varying load torque to said spindle tending to produce chatter between said sleeve and spindle, a contractable split collet received on said spindle and axially positionable relative thereto, said collet having a tapered external surface, an expandable split collet received in said sleeve at the other end thereof, said expandable collect having a tapered internal surface adapted to engage said tapered external surface, a set of springs received in said sleeve and engaged with one end of said contractable collet to urge said contractable collect toward said expandable collet and produce forces between said tapered surfaces tending respectively to contract and expand said collets for relatively fixing said sleeve and spindle together, said forces tending to suppress said chatter, an annular plunger received around said spindle at said other end of said sleeve, means selectively operable to urge said plunger toward said contractable collet and move said contractable collet away from said expandable collet against said set of springs, said tapered surfaces thereby separated and said spindle released from said sleeve for axial adjustment, and means to axially adjust said spindle in said sleeve.

5. In a machine tool spindle mechanism comprising in combination, a rotatable drive sleeve having a splined bore at one end thereof, a spindle received through said sleeve having an elongated splined diameter mating with said bore, means to rotate said sleeve and effect rotation of said spindle, a cutting tool fixed to said spindle, said tool operable to transmit a rapidly varying load torque to said spindle tending to produce chatter between said sleeve and spindle, a contractable split collet received on said spindle and axially positionable relative thereto, said collet having a tapered external surface, an expandable split collet received in said sleeve at the other end thereof, said expandable collect having a tapered internal surface adapted to engage said tapered external surface, a set of springs received in said sleeve and engaged with one end of said contractable collet to urge said contractable collet toward said expandable collet and produce forces between said tapered surfaces tending respectively to contract and expand said collets for relatively fixing said sleeve and spindle together, said forces tending to suppress said chatter, an annular plunger received around said spindle at said other end of said sleeve, means defining a hydraulic cylinder to enclose said plunger, means to selectively introduce fluid under pressure into said cylinder to move said plunger toward said contractable collet and create a releasing force to overcome said set of springs, an annular thrust bearing received between said plunger and contractable collet to transmit said releasing force to said contractable collect and move said collets apart, said tapered surface thereby separated and said spindle released from said sleeve for axial adjustment, and means to axially adjust said spindle in said sleeve.

References Cited in the file of this patent

UNITED STATES PATENTS

| | | |
|---|---|---|
| 1,598,839 | Wills | Sept. 7, 1926 |
| 2,427,322 | Darner | Sept. 9, 1947 |
| 2,924,979 | Kalikow | Feb. 16, 1960 |
| 3,034,408 | Kampmeier | May 15, 1962 |

FOREIGN PATENTS

| | | |
|---|---|---|
| 188,182 | Austria | Jan. 10, 1957 |